US006784584B2

(12) United States Patent
Knoll et al.

(10) Patent No.: US 6,784,584 B2
(45) Date of Patent: Aug. 31, 2004

(54) ELECTRIC MOTOR

(75) Inventors: Andreas Knoll, Dortmund (DE);
Wolfgang Zacher, Doebeln (DE);
Michael Weinert, Leisnig (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/278,289

(22) Filed: Oct. 23, 2002

(65) Prior Publication Data
US 2003/0102765 A1 Jun. 5, 2003

(30) Foreign Application Priority Data

Oct. 24, 2001  (DE) ......................................... 101 52 499

(51) Int. Cl.[7] ................................................ H02K 3/00
(52) U.S. Cl. ........................ 310/179; 310/180; 310/218
(58) Field of Search ................................. 310/216, 217, 310/218, 71, 179, 180

(56) References Cited

U.S. PATENT DOCUMENTS

| | | | | |
|---|---|---|---|---|
| 3,130,336 A | | 4/1964 | Morris ........................ | 310/254 |
| 4,752,707 A | * | 6/1988 | Morrill ........................ | 310/184 |
| 4,912,353 A | | 3/1990 | Kondo et al. ................ | 310/239 |
| 6,064,132 A | * | 5/2000 | Nose ............................ | 310/216 |
| 6,137,199 A | * | 10/2000 | Lindsley ...................... | 310/74 |
| 6,335,582 B1 | * | 1/2002 | Abukawa et al. ........... | 310/214 |
| 6,373,163 B1 | * | 4/2002 | Oohashi et al. ............. | 310/198 |

FOREIGN PATENT DOCUMENTS

| | | | | |
|---|---|---|---|---|
| DE | 3833130 | 6/1989 | ............ | H02K/1/12 |
| DE | 9010318.1 | 12/1991 | ............ | H02K/1/12 |
| DE | 19506267 | 8/1996 | ............ | H02K/1/16 |
| DE | 19652795 | 6/1998 | ............ | H02K/1/14 |
| DE | 19842948 | 3/2000 | ............ | H02K/1/16 |
| DE | 19961339 | 7/2001 | ............ | H02K/1/16 |
| EP | 0615330 | 9/1994 | ............ | H02K/1/16 |

* cited by examiner

Primary Examiner—Dang Le
Assistant Examiner—Nguyen N Hanh
(74) Attorney, Agent, or Firm—Ohlandt, Greeley, Ruggiero & Perle, L.L.P.

(57) ABSTRACT

The electric motor comprises an internal rotor and an external stator with stator windings. The rotor comprises several permanently magnetic pole shoes. The stator windings are supported by stator pole shanks comprising, radially inside, stator pole shoes facing the rotor pole shoes. Via a short circuit bridge, the stator pole shoes are connected with the adjacent stator pole shoes so that all the stator pole shanks are integrally formed with each other. Radially outside, the stator pole shanks and stator pole shoes are connected with each other only by a separate yoke ring set thereon. All the windings are wound from radially outside with one single continuous winding wire when the yoke ring has been removed.

7 Claims, 3 Drawing Sheets

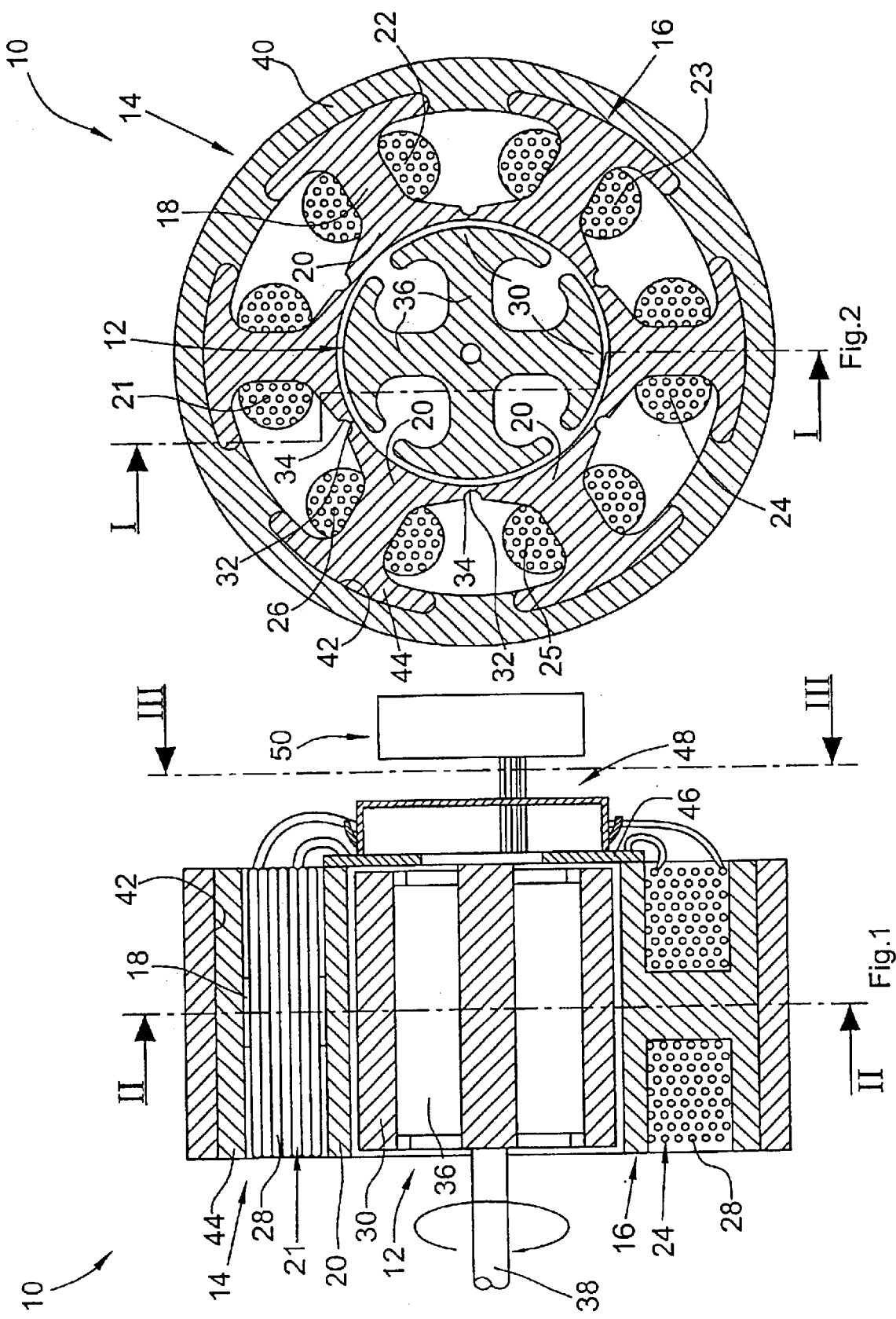

ELECTRIC MOTOR

FILED OF THE INVENTION

The invention relates to an electric motor with an internal rotor and an external stator with stator coils.

DISCUSSION OF THE BACKGROUND ART

In known electric motors, the stator is formed by a yoke ring and stator pole shanks projecting radially inward therefrom and provided with pole shoes. There is no direct material connection between two adjacent pole shoes in order to lead a maximum of the magnetic flux necessary for the moment set-up through pole shanks and yoke ring. Further, a magnetic short circuit between two pole shoes and thus a worse power density of the motor is thus avoided. In case of an integrally formed stator body, a winding of the stator pole shanks is only possible from the stator center which is difficult or impossible in case of small electric motors in particular and possibly requires high mechanical efforts. To avoid this, it is possible to configure stator pole shanks separately, wind them separately first and subsequently assemble them to form a closed stator. Alternatively, the stator may also comprise an integral basic stator body the stator pole shanks of which are connected, radially inside in the region of the pole shoes, with the respectively adjacent pole shoes by short circuit bridges. The pole shanks may be wound from radially outside. After the windings have been wound, a yoke ring is set upon so that the pole shanks comprise a magnetic connection radially outside.

SUMMARY OF THE INVENTION

It is the object of the present invention to facilitate the production of an external stator.

This object is solved, according to the invention, with the features of claims 1 and 6, respectively.

To simplify the winding, the stator comprises an integral basic stator body the stator pole shanks of which are connected radially inside with the respectively adjacent pole shoes by short circuit bridges in the region of the pole shoes. Radially outside, the stator pole shanks are merely connected with each other by a separate yoke ring set thereon. When the yoke ring is detached, the stator pole shanks are accessible from outside so that all the stator pole shanks can be wound from outside. The basic stator body is held together by the short circuit bridges between the adjacent pole shoes. The stator pole shanks can be simply wound from outside so that even a very small external stator can be produced in this manner. The integrity of the basic stator body permits a simple and cost-efficient production. The short circuit bridge between the stator pole shoes consists of the same material as the pole shoes and the stator. Thus, the short circuit bridge creates a magnetic short circuit of the respective stator tooth to both neighboring pole shoes and stator pole shanks, respectively. Although this worsens the power density of the electric motor, the losses can be kept so small that, as a whole, they are of hardly any consequence. Because of the short circuit bridges between the stator pole shoes, a cylinder-like and slot-free inner circumference of the stator can be realized. This lessens the air resistance and the corresponding wind noise, particularly if the rotor rotates fast. Further, due to the magnetic short circuit via the short circuit bridges, the rest moments acting on the rotor are reduced whereby, when the motor is in operation, the excitation of vibrations effected thereby is reduced. Thereby, in turn, the noise emission is reduced and the mechanical wear is reduced.

According to the invention, all the windings on the stator pole shanks are wound with one single continuous winding wire and in one go. The starting and the end point of the winding wire are together on the same contact point. Thereby, the winding of the windings is greatly simplified and accelerated and an approximate faultlessness of the windings and their contacting is secured.

Preferably, two parallel-connected windings of a winding pair can be connected directly with each other and the winding pairs, in turn, can be connected in series with each other. The formation of winding pairs of two stator windings that are to be powered at the same time, respectively, facilitates the winding of all the windings with a single winding wire. If the stator comprises only three pole shanks altogether, the winding of one pole shank can be divided into two partial windings. This principle is also applicable to electric motors with more than three poles. In the case of a stator with six poles, the winding sequence is 1-4-2-5-3-6.

Preferably, the winding wire connections between the winding pairs form a common neutral point. The neutral point is preferably formed by an integral neutral point metal sheet. Thus, all the winding wire connections between two winding pairs lie on a common voltage potential. Thereby, a simple circuit structure and a simple wiring of the control and power electronics for the electronic commutation of the windings is realized.

Preferably, a central body of the neutral point metal sheet is located centrally in a transverse plane, and contact pins for contacting the winding wire connection between two winding pairs axially project therefrom. Thus, a simple integral neutral point metal sheet is formed on which, if necessary, the control and power electronics for commutating the windings can be fixed. The winding wire can be connected with the neutral point metal sheet contact pins by an automatic welding, soldering or crimping procedure. Thus, a simple, cost-efficient and secure contacting of the corresponding winding wire sections with the neutral point metal sheet is realized.

In order to be able to securely fix the neutral point metal sheet in an insulating disc, the contact pins may have barbs excluding an undesired detachment of the neutral point metal sheet from the insulating disc.

According to a preferred embodiment, the smallest cross section of the short circuit bridges is respectively chosen to be so small that maximally 20% of the magnetic flux of a winding are shorted via them. The smallest cross section of the short circuit bridge is chosen such that, on the one hand, a sufficient mechanical stability of the connection between the two respective stator pole shoes is still given, on the other hand, however, the losses permitted because of the magnetic short circuit via them are small.

Preferably, the rotor pole shoes contain rare earths and are configured, for example, as NdFeB rotor. Thereby, the short circuit portion of the short circuit bridge of the entire magnetic flux produced is kept as small as possible and the useful portion of the magnetic flux produced is kept as large as possible.

In the ideal case, the short circuit bridge is so small that it is magnetically saturated for the most time so that its magnetic conductivity tends towards zero when it is saturated. Thereby, the magnetic loss is reliably limited to a low maximum value.

According to a method for manufacturing an external stator with several stator pole shanks respectively supporting a winding, the stator pole shoes allocated thereto being respectively connected with the two adjacent stator pole shoes, the following method steps are provided:

manufacturing the integral basic stator body with the stator pole shanks and the stator pole shoes, winding all the stator windings on the stator pole shanks from radially outside in one go with one single winding wire, and setting a separate yoke ring outside onto the stator pole shanks.

With this method, an integral basic stator body is wound in a very simple and cost-effective manner. Thereby, the winding is considerably simplified and accelerated, particularly with basic stator bodies with small inner diameters.

BRIEF DESCRIPTION OF THE DRAWINGS

Hereinafter, an embodiment of the invention is explained in detail with respect to the drawings.

In the Figures:

FIG. 1 shows a longitudinal section of the electric motor according to the invention, FIG. 2 shows a cross section of the electric motor according to the invention of FIG. 1.

DETAILED DESCRIPTION OF THE PREFERRED EMBODIMENT

Figure 3:
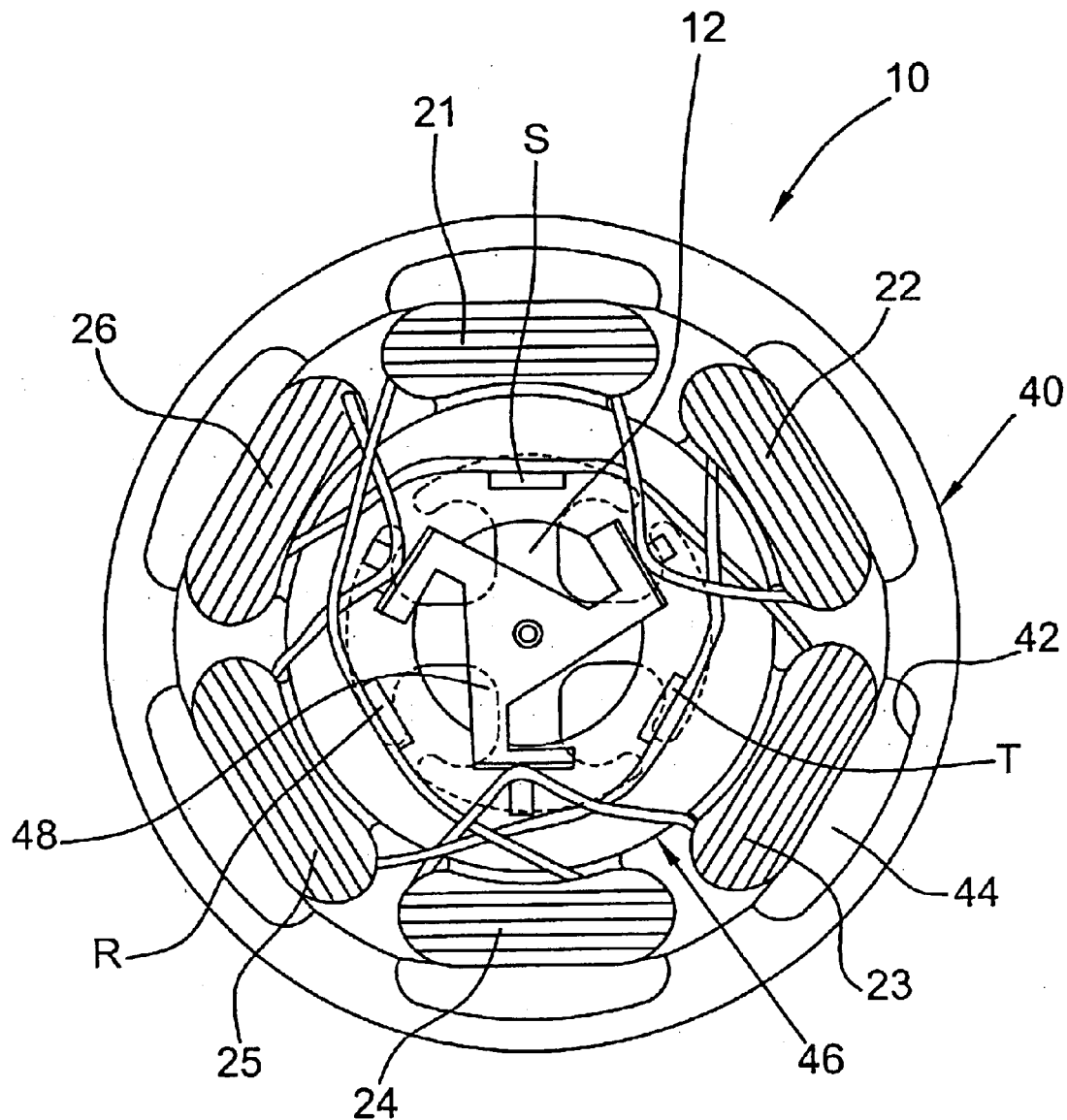
FIG. 3 shows a top view of one of the two front faces of the electric motor of FIG. 1.

In FIGS. 1 through 3, respectively, different sections and views of an electric motor 10 such as it is used in motor vehicles, for example, for driving auxiliary aggregates, are represented. The electric motor 10 is commutated electronically, i.e., the pole windings are driven via appropriate control and driver electronics in a "contactless" manner.

The electric motor 10 comprises an internal rotor 12 and an external stator 14. The stator 14 is formed by an integral basic stator body 16 substantially consisting of six radial pole shanks 18 and pole shoes 20 respectively joined thereto inside. Each pole shank 18 comprises a winding 21–26 forming an electromagnetic coil, said windings all being wound of a single winding wire 28. The basic stator body 16 is formed of ferromagnetic metal sheets.

The rotor 12 comprises four pole shoes being arranged at an angle of 90° with respect to each other. The rotor pole shoes 30 form the axially outer heads of the four rotor arms 36. The rotor arms 36 centrally converge in a rotor shaft 38. The rotor body consists of a material including rare earths, of NdFeB, for example.

Via a short circuit bridge 32, each stator pole shoe 20 is connected to both respectively adjacent stator pole shoes 20 so that the entire basic stator body 16 is integrally formed. The inner circumference formed by the stator pole shoes 20 is cylindrical and free of any gaps. Even at high rotor speeds, the air resistance and noise emissions are kept low thereby.

The stator pole shoes form an inner ring comprising a rounded axial groove 34 in the region of the short circuit bridges 32. The axial groove 34, however, may also have a V-shaped or rectangular cross section. By the short circuit bridges 32, all the stator pole shanks 18 and stator pole shoes 20 are rigidly and integrally connected with each other. Outside, an integral yoke ring 40 of ferromagnetic material is set upon the basic stator body 16. At its inner circumference, the yoke ring 40 comprises six axial recesses 42 into which head pieces 44 of the pole shanks 18, having a corresponding T-shape, are inserted. The recesses and head pieces may also have a semicylindrical configuration.

At one of the two front faces of the electric motor 10, an electrically nonconductive insulating disc 46 is fastened to the axial end faces of the stator pole shoes 20, as is particularly shown in FIG. 3. A neutral point metal sheet 48 of electrically conductive material is axially plugged onto the insulating disc 46. For the windings 21–26, the neutral point metal sheet 48 forms a central neutral point to which one end of each winding 21–26 is connected.

Figures 5, 6:
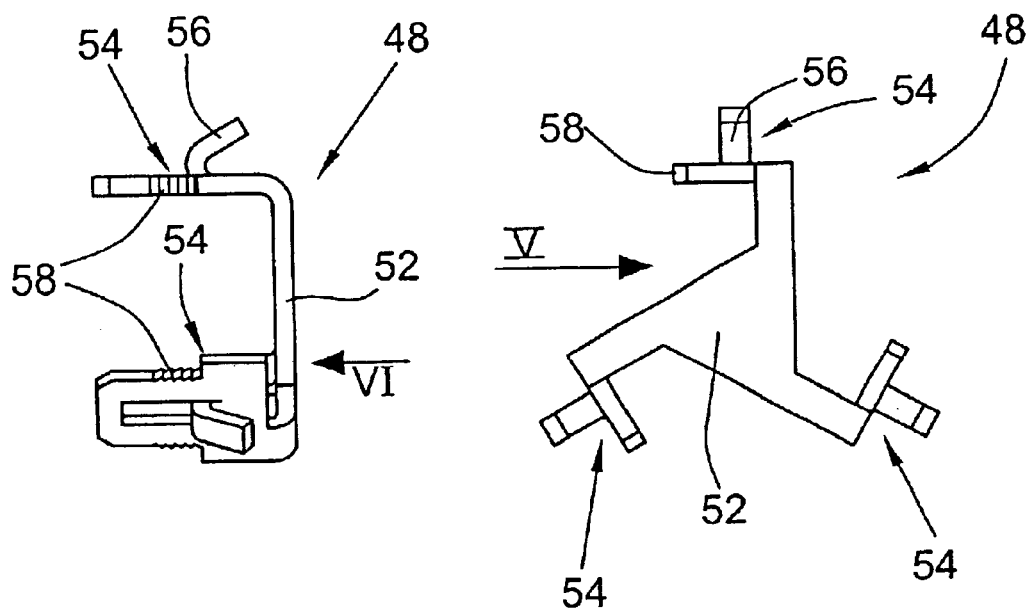
FIG. 5 shows a side view of a neutral point metal sheet of the electric motor of FIG. 1.
FIG. 6 shows a top view of the neutral point metal sheet of FIG. 5.

As illustrated in the FIGS. 5 and 6, the neutral point metal sheet 48 comprises a central body 52 which is located in a transverse plane and from which three contact pins 54 axially project. The contact pins 54 have two functions. On the one hand, they are plugged into the plastic insulating disc whereby the neutral point metal sheet 48 is fastened to and fixed at the insulating disc 46. On the other hand, each contact pin 54 comprises a tab 56 into which the passing winding wire 28 is hooked and, if necessary, soldered or welded. To provide a better anchorage of the neutral point metal sheet 48 in the insulating disc 46, each contact pin 54 laterally comprises catch teeth 58 by which the contact pins 54 are prevented from falling out or being withdrawn of the insulating disc 46.

Further, three more tabs R,S,T are disposed on the insulating disc 46 with which the other ends of the windings 21–26 are respectively connected in pairs.

Figure 4:
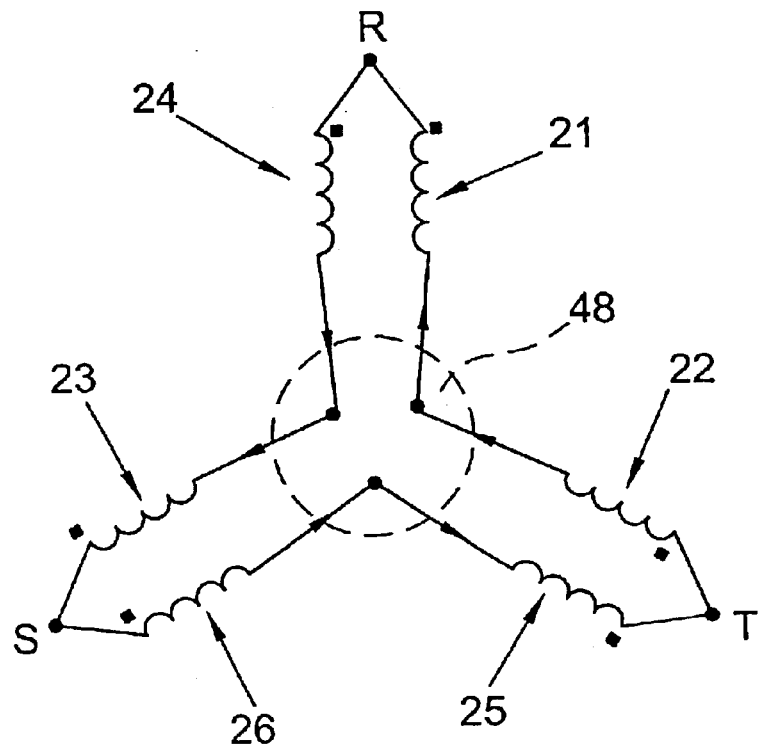
FIG. 4 shows a representation of the winding sequence of the electric motor of FIG. 1, which comprises six windings altogether.

The winding sequence and contacting is illustrated in FIG. 4. The two windings 21,24;22,25;23,26 opposite each other are respectively connected in parallel and form a winding pair. Each of the two ends of a winding pair 21,24;22,25;23,26 is connected with the neutral point metal sheet 48. The bridge between the two windings of a winding pair 21,24;22,25;23,26 is connected with one of the three tabs R,S,T.

Near the neutral point metal sheet 48, an electronic control device 50 is provided that is connected to the tabs R,S,T via three electric lines. The control device 50 includes control electronics and driver modules and provides the electric commutation of the windings 21–26.

During the manufacture of the stator, the pole shanks 18 of the basic stator body accessible from the outside are wound one after the other, as illustrated by the arrows in FIG. 4. Thus, all the windings 21–26 are wound with a single winding wire 28. The starting and the end point of the winding coincide at a contact point of the neutral point metal sheet 48 or of one of the tabs R,S,T. After the windings 21–26 have been wound, the yoke ring 40 is pushed outside onto the head pieces 44 of the stator pole shanks 18.

Due to the stator geometry with stator pole shanks 18 accessible from outside, which are held together inside by the short circuit bridges 32, a considerable simplification and saving of time for the winding of the windings is achieved, particularly for electric motors with a small rotor diameter and a great number of windings. By the short circuit bridges 32, the rest moments are reduced, particularly with electric motors with high power density, so that the vibrational stress and noise emission resulting therefrom are also reduced. The rest moments can be further reduced by bevelling the groove.

The automatic winding of the stator windings 21–26 is greatly simplified or only just made possible by the selected winding sequence and the parallel connection of two windings. Connection faults can almost be excluded.

By the use of only one neutral point metal sheet 48 for forming a neutral point, a star connection is realized with simple means and only one component.

What is claimed is:

1. An electric motor comprising an internal rotor and an external stator with stator windings, wherein
    said internal rotor comprises a plurality of permanently magnetic pole shoes, and
    said external stator comprises a plurality of stator pole shanks supporting a plurality of windings and comprising, radially inside, stator pole shoes facing said magnetic pole shoes,
    said stator pole shoes are connected with the adjacent stator pole shoes via a short circuit bridge, so that all said stator pole shanks and said stator pole shoes are integrally formed with each other, and
    said stator pole shanks are externally connected with each other only by a separate yoke ring set thereon, said plurality of windings having been wound from radially outside with said yoke ring removed, wherein all said windings of said stator are wound with one single continuous winding wire, wherein two parallel-connected windings of a winding pair are directly connected with each other and said winding pairs are connected in series with each other, said winding pairs forming a connection, said connection forming a common neural point, said neural point being formed by an integral neural point metal sheet having a central body, and wherein said central body is centrally located in a transverse plane.

2. The electric motor according to claim 1, wherein said stator has six poles and comprises the winding sequence 1-4-2-5-3-6.

3. The electric motor according to claim 1, wherein the smallest cross section of said short circuit bridges has been selected so small that maximally 20% of the magnetic flux generated by said plurality of windings is shorted via them.

4. The electric motor according to claim 1, wherein said stator pole shoes form a closed inner ring comprising one axial groove in the region of each of said short circuit bridges.

5. The electric motor according to claim 1, wherein said magnetic pole shoes comprise a material containing rare earths.

6. A method for manufacturing an external stator according to claim 1 comprising:
    manufacturing an integral basic stator body with said stator pole shoes connected with each other by said short circuit bridges,
    winding said stator pole shanks with said stator windings from radially outside in one go with one single winding wire, and
    setting said yoke ring outside onto said stator pole shanks.

7. An electric motor comprising:
    a rotor with a plurality of magnetic pole shoes;
    a stator having a plurality of windings being supported on a plurality of stator pole shanks, said plurality of stator pole shanks forming a plurality of stator pole shoes for supporting said plurality of windings, said plurality of stator pole shoe facing said magnetic pole shoes, wherein said stator is formed in one piece, and wherein said plurality of stator pole shoes are connected with an adjacent stator pole shoes via a short circuit bridge, said plurality of stator pole shanks and said plurality of stator pole shoes being integrally formed with each other, said plurality of windings being wound from outside the electric motor, wherein said windings of said stator are wound with a continuous winding wire, and wherein two parallel-connected windings of a winding pair of said plurality of windings are directly connected with each other, said winding pairs are connected in series with each other, said winding pairs forming a connection, said connection forming a common neural point, said neural point being formed by an integral neural point metal sheet having a central body, and wherein said central body is centrally located in a transverse plane.

* * * * *